(12) United States Patent
Sakamoto et al.

(10) Patent No.: US 11,454,757 B2
(45) Date of Patent: Sep. 27, 2022

(54) MULTI-CORE FIBER CONNECTOR

(71) Applicant: Nippon Telegraph and Telephone Corporation, Tokyo (JP)

(72) Inventors: Taiji Sakamoto, Tokyo (JP); Yoshiteru Abe, Tokyo (JP); Kazuhide Nakajima, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/260,401

(22) PCT Filed: Jul. 11, 2019

(86) PCT No.: PCT/JP2019/027508
§ 371 (c)(1),
(2) Date: Jan. 14, 2021

(87) PCT Pub. No.: WO2020/017422
PCT Pub. Date: Jan. 23, 2020

(65) Prior Publication Data
US 2021/0263213 A1    Aug. 26, 2021

(30) Foreign Application Priority Data

Jul. 19, 2018  (JP) ............................. JP2018-136262

(51) Int. Cl.
*G02B 6/02* (2006.01)
*G02B 6/12* (2006.01)
(Continued)

(52) U.S. Cl.
CPC ..... *G02B 6/02042* (2013.01); *G02B 6/12002* (2013.01); *G02B 6/122* (2013.01); *G02B 6/262* (2013.01)

(58) Field of Classification Search
None
See application file for complete search history.

(56) References Cited

FOREIGN PATENT DOCUMENTS

| CA | 102902024 | 1/2013 |
|---|---|---|
| JP | 2011-237573 | 11/2011 |

(Continued)

OTHER PUBLICATIONS

Amma et al., "Accuracy of core alignment with end-view function for multicore fiber," IEEE Summer Topical Meeting, 2014, Paper TuE2.4, pp. 170-171.

(Continued)

*Primary Examiner* — Chad H Smith
(74) *Attorney, Agent, or Firm* — Fish & Richardson P.C.

(57) ABSTRACT

A planar waveguide having M×N number of cores and to which M number of fibers having N number of cores are connected. In the planar waveguide, in a connecting end surface of the planar waveguide to which the fibers are connected, P number of fibers having Q number of cores are connected, M×N is equal to P×Q, the planar waveguide includes a plurality of the cores arranged in a horizontal direction at the same height position in the planar waveguide, and a laminated structure having the cores at different positions in a height direction, so as to be aligned with the cores of the fibers connected to the connecting end surface, and the positions of the M×N number of cores are constant in the height direction, and change only in the horizontal direction.

3 Claims, 21 Drawing Sheets

(51) Int. Cl.
G02B 6/122 (2006.01)
G02B 6/26 (2006.01)

(56) References Cited

FOREIGN PATENT DOCUMENTS

| | | |
|---|---|---|
| JP | 2013-076893 | 4/2013 |
| JP | 2016-057447 | 4/2016 |
| JP | 2017-003726 | 1/2017 |

OTHER PUBLICATIONS

Matsui et al., "118.5 Tbit/s Transmission over 316 km-Long Multi-Core Fiber with Standard Cladding Diameter," OECC, 2017, Paper S2892, 2 pages.

Thomson et al., "Ultrafast-laser inscription of a three dimensional fan-out device for multicore fiber coupling applications," Opt. Express, 2007, 15:11691-11697.

Uemura et al., "Fused Taper Type Fan-in/Fan-out Device for 12 Core Multi-Core Fiber," OECC, Melbourne, Australia, Jul. 6-10, 2014, Paper MO1E.4, pp. 49-50.

Winzer, "Optical Networking Beyond WDM," IEEE Photonics Journal, 2012, 4(2):647-651.

Awad, "Confined optical beam-bending for direct connection among cores of different multicore fibers," Optical and Quantum Electronics, Jan. 22, 2018, 50:69, 14 pages.

Watanabe et al., "Stacked polymer waveguide type fan-in/fan out device for dense multi-core fibre," IET Optoelectronics, The Institution of Engineering and Technology, 2015, 9(4):158-162.

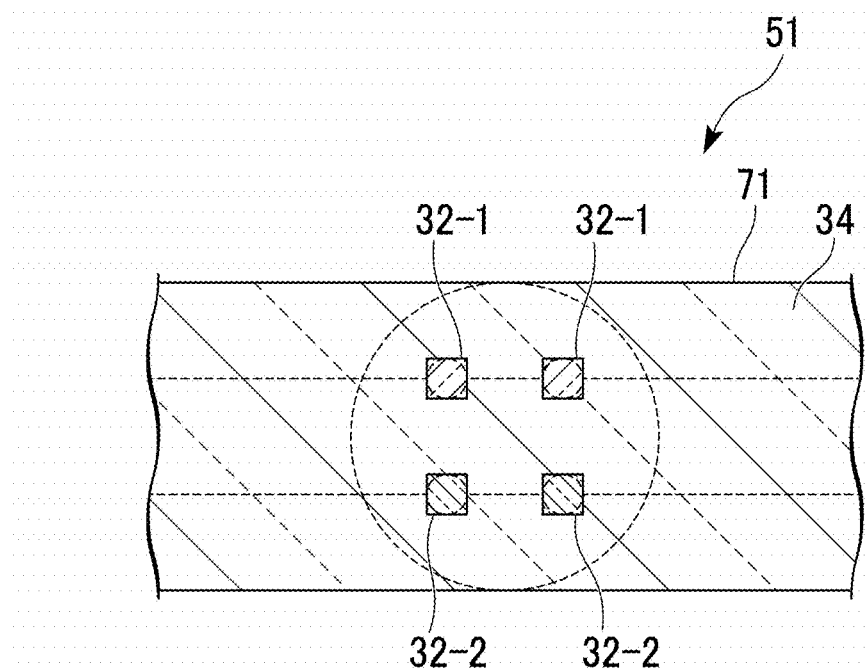

MULTI-CORE FIBER CONNECTOR

CROSS-REFERENCE TO RELATED APPLICATIONS

This application is a National Stage application under 35 U.S.C. § 371 of International Application No. PCT/JP2019/027508, having an International Filing Date of Jul. 11, 2019, which claims priority to Japanese Application Serial No. 2018-136262, filed on Jul. 19, 2018. The disclosure of the prior application is considered part of the disclosure of this application, and is incorporated in its entirety into this application.

TECHNICAL FIELD

The present invention relates to a multi-core fiber connector that separates cores of a multi-core fiber into a core of a single mode fiber, or achieves a connection between MCFs having different number of cores.

BACKGROUND ART

In the recent years, research and development has been performed on a high-capacity optical communication system using the space division multiplexing (SDM) technology (for example, see Non Patent Literature (NPL) 1). Examples of optical fibers used for SDM transmission include multi-core optical fibers (Multi-core Fibers: MCFs) having a plurality of cores in the same cladding (for example, see NPL 2).

Unlike single mode fibers (SMFs) having a single core in the center of the cladding, a plurality of cores are arranged on the surface of the cladding of an MDF. When connecting two MCFs, it is necessary to adjust the rotational direction of one of the MCFs with respect to the other MCF (for example, see NPL 3). In a transmission system using an MCF, from the viewpoint of consistency, it is useful for a transceiver to be configured on the basis of an existing SMF. Thus, a fan-in/fan-out (FIFO) for separating each core of the MCF into an SMF has been considered (see, for example, NPL 4, 5).

CITATION LIST

Non Patent Literature

NPL 1: P. J. Winzer, "Optical networking beyond WDM," IEEE Photon. J., vol. 4, no. 2, pp. 647-651 (2012).
NPL 2: T. Matsui et al., "118.5 Tbit/s transmission over 316 km-long multi-core fiber with standard cladding diameter," OECC2017, paper s2892 (2017).
NPL 3: Y. Amma et al., "Accuracy of core alignment with end-view function for multi-core fiber," IEEE Summer Topical Meeting, paper TuE2.4 (2014).
NPL 4: H. Uemura et al., "Fused taper type fan-in/fan-out device for 12 core multi-core fiber," OECC2014, paper MO1E.4 (2014).
NPL 5: R. R. Thomson et al., "Ultrafast-laser inscription of a three dimensional fan-out device for multi-core fiber coupling application," Opt. Express, vol. 15, pp. 11691-11697 (2007).

SUMMARY OF THE INVENTION

Technical Problem

However, according to the current FIFO technology, cores of a single MCF can be separated into a plurality of SMFs, but it is not possible to collectively separate cores of multiple MCFs into SMFs, thus necessitating the same number of FIFOs as the number of MCFs, and complicating the configuration of the transmission system. In addition, if the optical transmission line is constructed by different types of MCFs having different number of cores, it is necessary to separate one of the MCFs into SMFs, and then connect the SMFs to the MCF different from the MCF described earlier, thereby complicating the configuration of the optical transmission line.

FIG. 1A illustrates the configuration of a conventional FIFO, specifically using an MCF 12, SMFs 14 and a multi-core fiber connector 10. The conventional multi-core fiber connector 10 has a function of separating an MCF 12 with one core into a plurality of SMFs 14. The conventional multi-core fiber connector 10 uses, for example, a fiber bundle in which a plurality of SMFs are bundled and melt-drawn. It is possible to connect the fiber bundle and the MCF by aligning the position of the core of the fiber bundle and the position of the core of the MCF. However, in the configuration illustrated in FIG. 1, one multi-core fiber connector 10 is required for one MCF 12.

FIGS. 1B and 1C illustrate configurations of a FIFO that are respectively different from the configuration illustrated in FIG. 1A. The configuration illustrated in FIG. 1B includes MCFs 22, SMFs 14, and a multi-core fiber connector 20. In the multi-core fiber connector 10 illustrated in FIG. 1A, it is not possible to separate N number of MCFs 22 having M number of cores collectively into M×N number of SMFs 14, as illustrated in FIG. 1B. M and N are respectively any natural numbers, and integers equal to or greater than 2. On the other hand, a device that separates each core of an MCF into SMFs by writing a waveguide in bulk quartz glass with laser through the use of a femtosecond laser is being examined (for example, see NPL 5 descried earlier). According to a technique of writing a waveguide with a laser in a quartz glass, it is possible to collectively separate the cores of a plurality of MCFs 22 into SMFs. However, writing a waveguide requires a certain amount of laser irradiation time to induce a change in the refractive index of the quartz glass, thus increasing the fabrication time.

The configuration illustrated in FIG. 1C includes the MCFs 22, the SMFs 14, and a multi-core fiber connector 21. In the multi-core fiber connector 10 illustrated in FIG. 1A, it is not possible to separate N number of MCFs 22 collectively into N' number of MCFs 28 having M' number of cores, as illustrated in FIG. 1C. M' and N' are each positive integers equal to or greater than 2.

The present invention has been made in view of the above-described circumstances, and an object thereof is to provide an easy-to-fabricate multi-core fiber connector that enables separation of all cores of a plurality of MCFs into SMFs, and connection between MCFs having different number of cores.

Means for Solving the Problem

A multi-core fiber connector according to an embodiment of the present disclosure is a planar waveguide having M×N number of cores and to which M number of fibers having N number of cores are connected. In the multi-core fiber connector, in a connecting end surface of the planar waveguide to which the fibers are connected, P number of fibers having Q number of cores are connected, M×N is equal to P×Q, the planar waveguide includes a plurality of the cores arranged in a horizontal direction at the same height position in the planar waveguide, and a laminated structure having the cores at different positions in a height direction, so as to be aligned with the cores of the fibers connected to the connecting end surface of the planar waveguide, and the positions of the M×N number of cores are constant in the height direction, and change only in the horizontal direction.

In the multi-core fiber connector, M is an integer equal to or greater than 1, and N is an integer equal to or greater than 2.

In addition, Q is an integer equal to or greater than 1, and P is an integer equal to or greater than 1.

In the multi-core fiber connector according to the embodiment of the present disclosure, N may be 4, 8, or 12, Q may be 1, and P may be equal to M×N.

Moreover, the multi-core fiber connector according to the embodiment of the present disclosure may have any one of a structure where M is 4 and the cores are arranged in an annular shape, Q is 2, and P is equal to M×N/2, a structure where M is 8 and the cores are arranged in an annular shape, Q is 4, and P is equal to M×N/2, or a structure where M is 12 and the cores are arranged in a square lattice shape, Q is 4, and P is equal to M×N/3.

In the multi-core fiber connector according to the embodiment of the present disclosure, there may be k types of height positions of the cores in the planar waveguide, in order from the bottom, and k may be an integer equal to or smaller than 5.

Furthermore, in the multi-core fiber connector according to the embodiment of the present disclosure, k may be 4, M number of fibers on an input side with 8 cores arranged in an annular shape may be connected to an end surface on the input side, 2×M number of fibers on an output side with 4 cores arranged in a square lattice shape may be connected to an end surface on the output side, and the interval between the cores of the fibers on the input side may be the square root of 2 times the interval between the cores of the fibers on the output side.

In the multi-core fiber connector according to the embodiment of the present disclosure, k may be 4, M may be 1 and P may be 2, a first and a second planar waveguides may be connected together so as to form an angle of 90 degrees, four cores connected to cores at height positions of a second layer and a third layer in the first planar waveguide may be bent in the horizontal direction so as to be aligned with cores of one 4-core fiber connected to an end surface on an output side, four cores of the first planar waveguide at height positions of a first layer and a fourth layer may be joined with four waveguides of the second planar waveguide so as to be aligned with each other, and the four cores of the first layer and the fourth layer of the first planar waveguide may be bent in the height direction in the second planar waveguide so as to be aligned with cores of a 4-core fiber connected to an end surface on the output side.

Effects of the Invention

According to the present invention, it is possible to provide an easy-to-fabricate multi-core fiber connector that enables separation of all cores of a plurality of MCFs into SMFs, and connection between MCFs having different number of cores.

BRIEF DESCRIPTION OF DRAWINGS

FIG. 6A is a front view of an end surface of the multi-core fiber connector illustrated in FIG. 5.

DESCRIPTION OF EMBODIMENTS

Hereinafter, embodiments of the present disclosure will be described in detail with reference to the drawings.

In the present specification and the drawings, configurations having the same functions are designated by the same reference signs, and descriptions of such configurations are not repeated.

Figure 1A:
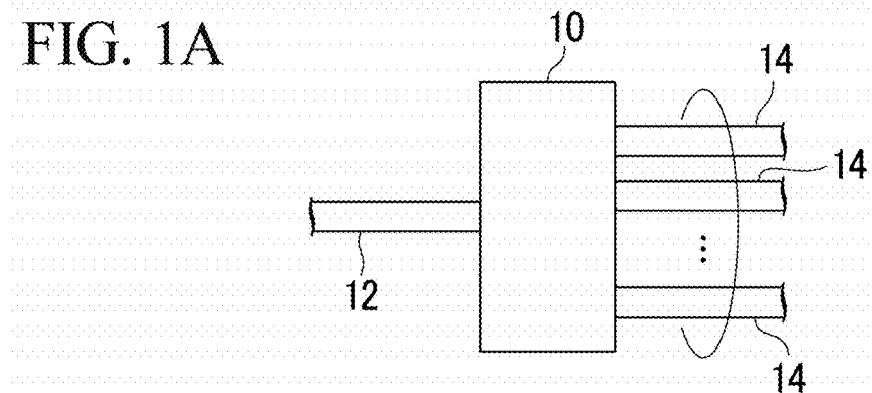
FIG. 1A is a schematic view of a FIFO using a conventional multi-core fiber connector.
Figure 1B:
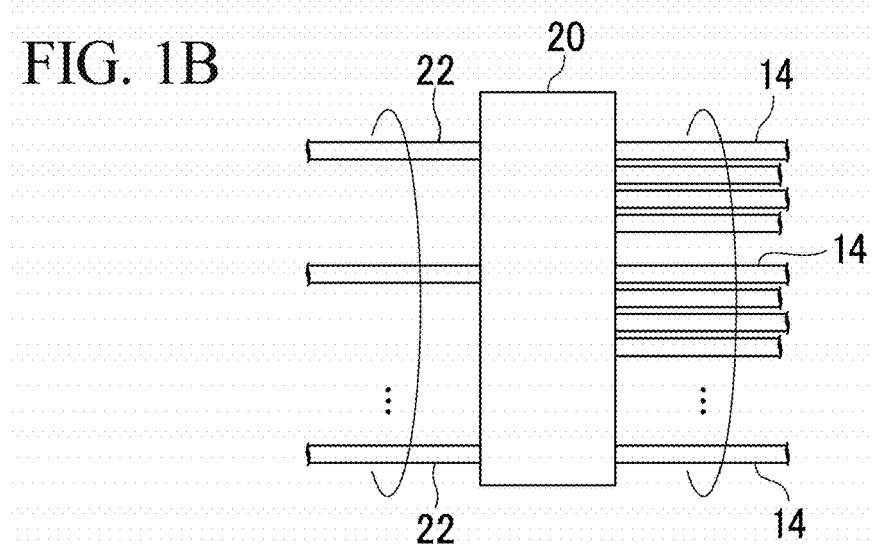
FIG. 1B is a schematic view of a FIFO having a different configuration than the FIFO illustrated in FIG. 1A.
Figure 1C:
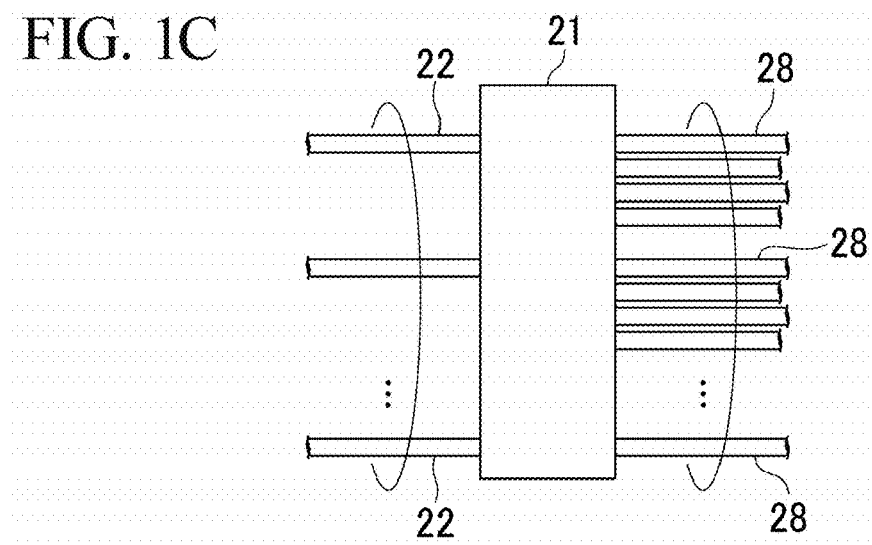
FIG. 1C is a schematic view of a FIFO having a different configuration than the FIFO illustrated in FIGS. 1A and 1B.

In a multi-core fiber connector according to an embodiment of the present disclosure, a planar waveguide is used to achieve the multi-core fiber connector 20 illustrated in FIG. 1B and the multi-core fiber connector 21 illustrated in FIG. 1C. Among planar waveguides, a planar lightwave circuit (PLC) has excellent mass productivity and enables integration of multiple optical waveguides.

Figure 2:
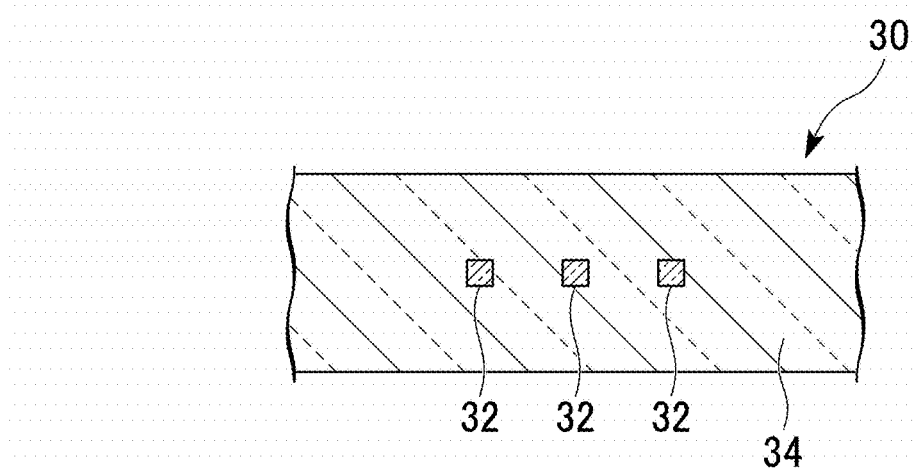
FIG. 2 is a cross-sectional view of a planar lightwave circuit.

FIG. 2 is a cross-sectional view of a PLC (planar waveguide) 30. The PLC 30 includes a core 32 in which light is guided and a cladding 34 surrounding the core 32. The refractive index of the cladding 34 is higher than the refractive index of the core 32.

Figure 3A:
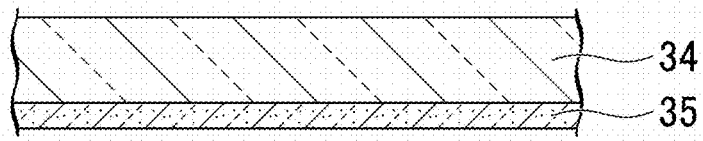
FIG. 3A is a cross-sectional view for explaining a manufacturing method of the planar lightwave circuit illustrated in FIG. 2.
Figure 3B:
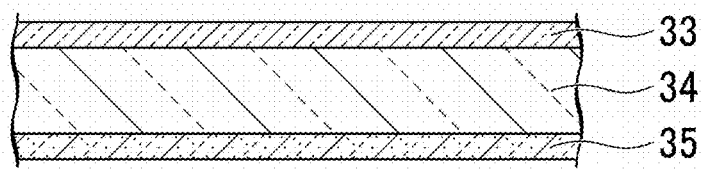
FIG. 3B is a cross-sectional view for explaining the manufacturing method of the planar lightwave circuit illustrated in FIG. 2.
Figure 3C:
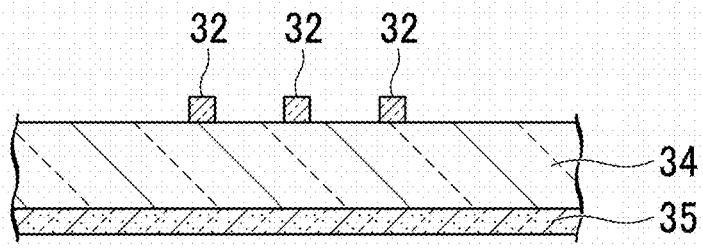
FIG. 3C is a cross-sectional view for explaining the manufacturing method of the planar lightwave circuit illustrated in FIG. 2.
Figure 3D:
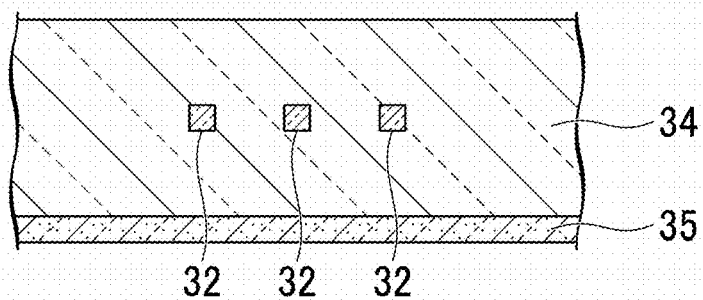
FIG. 3D is a cross-sectional view for explaining the manufacturing method of the planar lightwave circuit illustrated in FIG. 2.

FIGS. 3A to 3D are cross-sectional views for explaining a manufacturing method of the PLC 30. As illustrated in FIG. 3A, the cladding 34 made of high-purity quartz ($SiO_2$) is laminated on a base 35 made of silicon (Si). As illustrated in FIG. 3B, a core layer 33 made of quartz to which germanium oxide has been added is laminated on the cladding 34. As illustrated in FIG. 3C, the core layer 33 is processed to form cores 32 spaced apart from one another. Finally, as illustrated in FIG. 3D, the upper-layer cladding 34 is further laminated to cover the plurality of cores 32 and the lower-layer cladding 34, and the base 35 is removed as necessary. It is possible to manufacture the PLC 30 by the steps described above.

In the above-described manufacturing method of the PLC 30, the cores 32 are formed by etching with a mask. The shape in the planar direction (that is, in the direction along the surface of the PLC 30) can be controlled as desired by changing the pattern of the mask. On the other hand, the control in a height direction of the cores 32 is performed by the etching rate and the etching time. However, it is difficult to bend the cores 32 even when the etching rate or the etching time is adjusted, and the plurality of cores 32 has the same height.

In an MCF, cores are also present in the vertical direction in addition to the horizontal direction of the cross section, and thus, it is difficult to establish a connection with the MCF in the PLC 30.

First Embodiment

FIGS. 4A to 4F are cross-sectional views for explaining a manufacturing method of a PLC (the multi-core fiber connector according to an embodiment of the present disclosure) in which a connection can be established with an MCF.

Figure 4A:
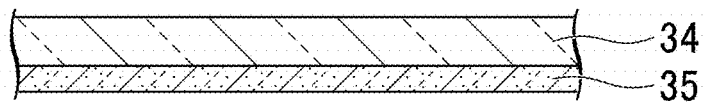
FIG. 4A is a cross-sectional view for explaining a manufacturing method of a planar lightwave circuit that enables connection with an MCF.
Figure 4B:
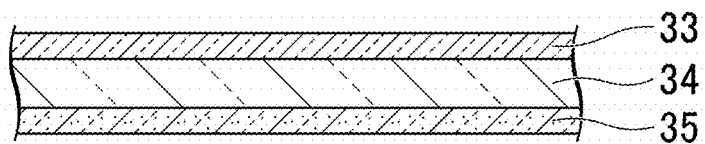
FIG. 4B is a cross-sectional view for explaining the manufacturing method of a planar lightwave circuit that enables connection with an MCF.
Figure 4C:
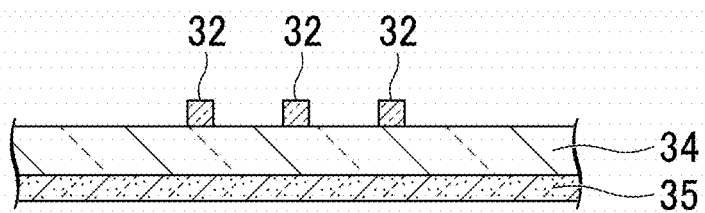
FIG. 4C is a cross-sectional view for explaining the manufacturing method of a planar lightwave circuit that enables connection with an MCF.
Figure 4D:
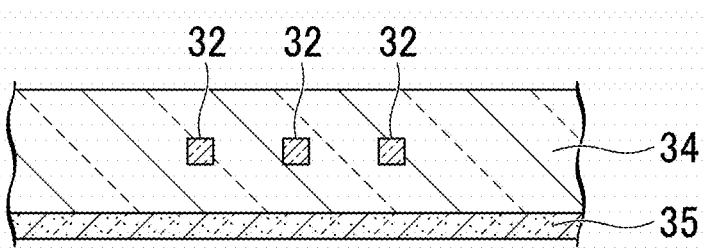
FIG. 4D is a cross-sectional view for explaining the manufacturing method of a planar lightwave circuit that enables connection with an MCF.
Figure 4E:
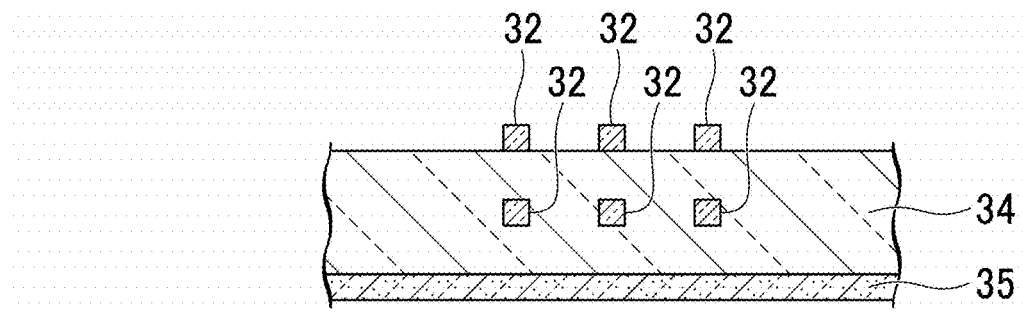
FIG. 4E is a cross-sectional view for explaining the manufacturing method of a planar lightwave circuit that enables connection with an MCF.
Figure 4F:
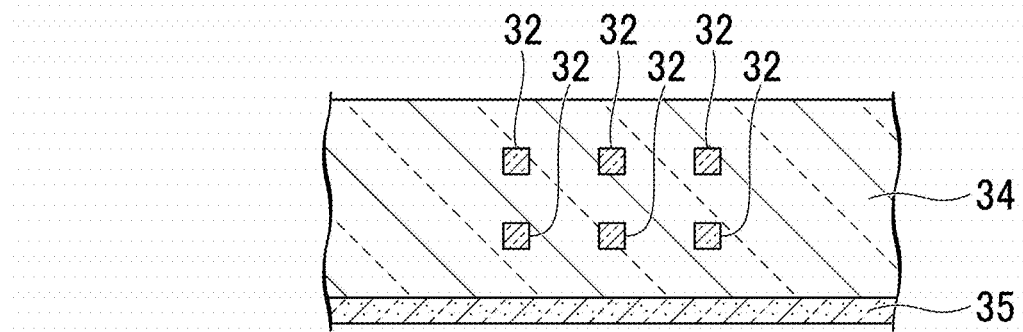
FIG. 4F is a cross-sectional view for explaining the manufacturing method of a planar lightwave circuit that enables connection with an MCF.

FIGS. 4A, 4B, 4C, and 4D illustrate steps similar to those in FIGS. 3A, 3B, 3C, and 3D, respectively. Next, as illustrated in FIG. 4E, cores 32 and an additional core layer (not illustrated) are deposited on the surface of the cladding 34 in which the cores 32 are embedded, and the process of forming the cores 32 by etching and overcladding is repeated. As illustrated in FIG. 4F, by further laminating the cladding 34 to cover the cores 32 on the upper side and the lower-layer cladding 34, it is possible to fabricate cores 32 with different positions in the height direction (that is, a laminated structure having cores at different positions in a height direction).

Figure 5:
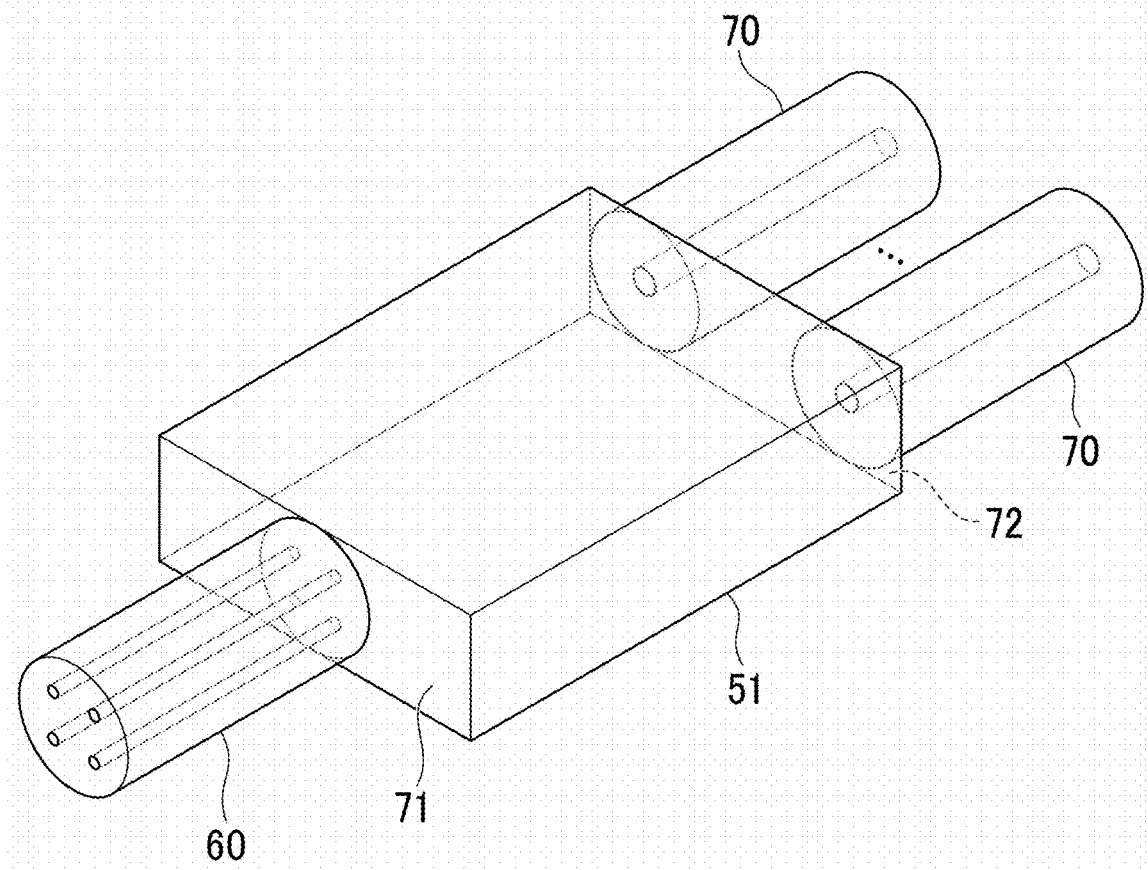
FIG. 5 is a perspective view of a multi-core fiber connector according to a first embodiment of the present disclosure.

FIG. 5 is a perspective view of a multi-core fiber connector 51 according to an embodiment of the present disclosure. M number (1 in FIG. 5) of 4-core MCFs 60 arranged in a square lattice shape are connected to an end surface (the connecting end surface) 71 of the multi-core fiber connector 51. 4×M number (4 in FIG. 5, two of which are omitted) of SMFs 70 are connected to an end surface (the connecting end surface) 72 of the multi-core fiber connector 51. M is any natural number.

Figure 6B:
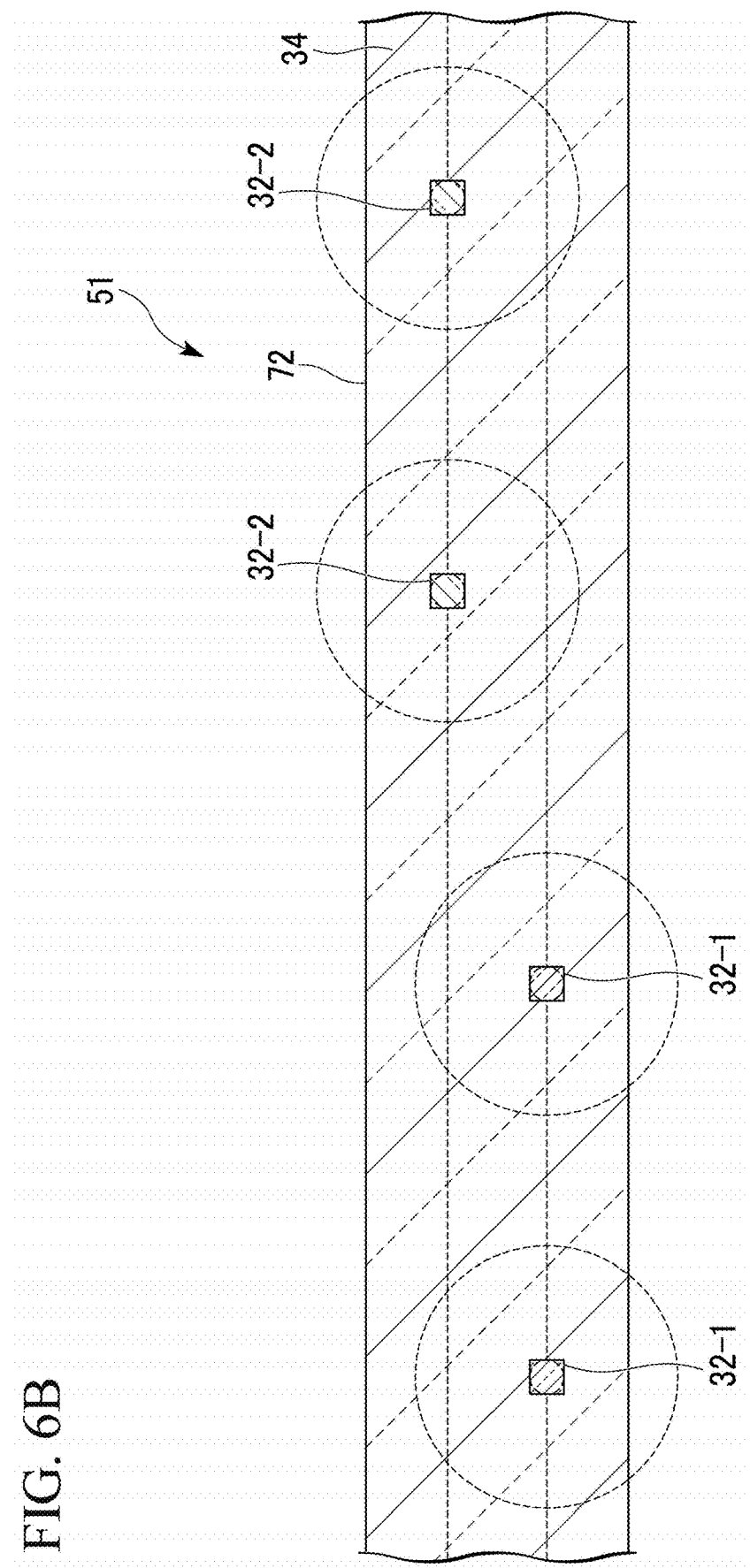
FIG. 6B is a front view of another end surface of the multi-core fiber connector illustrated in FIG. 5.

FIG. 6A is a front view of the end surface 71 of the multi-core fiber connector 51. FIG. 6B is a front view of the end surface 72 of the multi-core fiber connector 51. As illustrated in FIGS. 6A and 6B, according to the multi-core fiber connector 51, the two cores 32-1 and 32-2 arranged in a square lattice shape can be respectively classified into the two cores 32-1 and 32-2 in the two height directions.

Thus, by applying the manufacturing method illustrated in FIGS. 4A to 4F, it is possible to achieve the multi-core fiber connector 51 having cores 32-1 and 32-2 on the end surface 71 that can be connected to the cores 32 of the four-core MCFs 60.

On the end surface 72 side of the multi-core fiber connector 51, to connect each of the cores 32-1 and 32-2 to the SMFs 70, the cores 32-1 and 32-2 are curved in the horizontal direction and spaced at a distance of at least the outer diameter of the cladding of the SMFs 70 or greater, and then connected to the cores of the SMFs 70.

Figure 7:
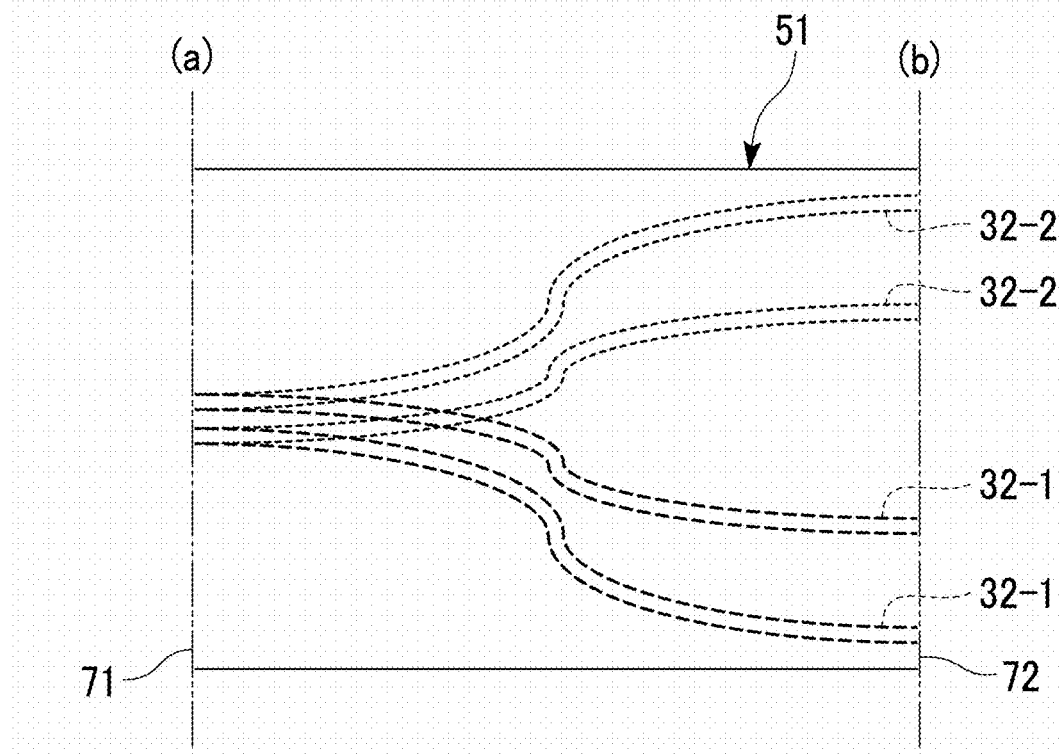
FIG. 7 is a plan view of a multi-core fiber connector with a core that has been curved.

The outer diameter of the cladding of SMFs is generally 125 μm, but the outer diameter of the claddings of SMFs having a narrow diameter is 80 μm. FIG. 7 is a plan view of the multi-core fiber connector 51 in which the cores 32-1 and 32-2 have thus been curved. As illustrated in FIG. 7, the cores on the end surface 71 side are bent in the horizontal direction, and to prevent the SMFs 70 connected to each of the cores 32-1 and 32-2 from coming in contact with each other at the end surface 72 (that is, the output end), the interval between the two cores 32-1 and the two cores 32-2 in the horizontal direction is widened.

As described above, according to the multi-core fiber connector 51, it is possible to connect the MCFs 60 and the SMFs 70 by only positional change in the horizontal direction in the shape of the cores 32-1 and 32-2 (that is, bending of the cores 32-1 and 32-2 in the horizontal direction) that is available in the PLC. In addition, according to the first embodiment, it is possible to achieve the multi-core fiber connector 51 having high mass productivity and integration.

Second Embodiment

Figure 8:
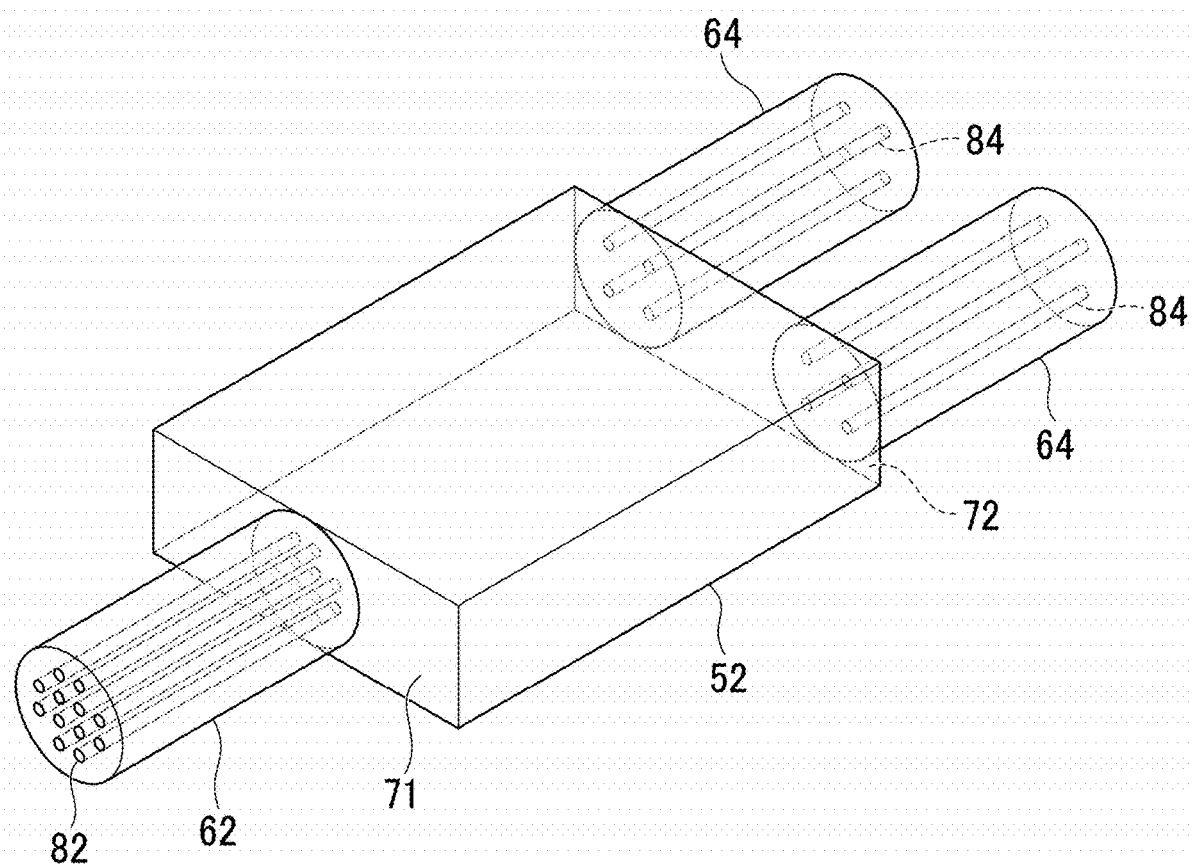
FIG. 8 is a perspective view of a multi-core fiber connector according to a second embodiment of the present disclosure.

FIG. 8 is a perspective view of a multi-core fiber connector 52 according to an embodiment of the present disclosure. M number (1 in FIG. 8) of 12-core MCFs 62 arranged in a square lattice shape are connected to the end surface 71 of the multi-core fiber connector 52. 3×M number (3 in FIG. 5, 1 in the center in the horizontal direction is omitted) of 4-core MCFs 64 are connected to an end surface 72 of the multi-core fiber connector 52.

Figure 9A:
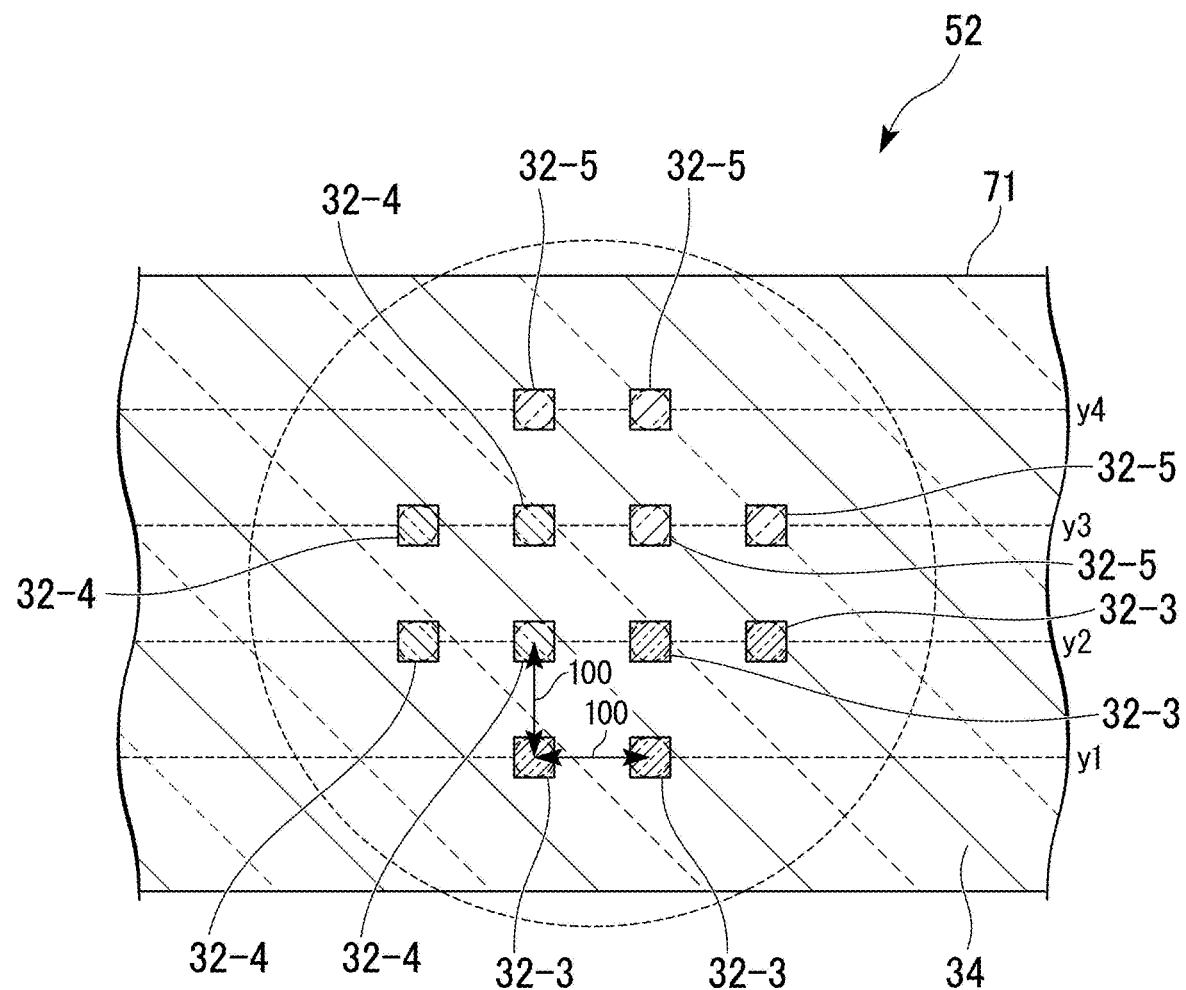
FIG. 9A is a front view of an end surface of the multi-core fiber connector illustrated in FIG. 8.
Figure 9B:
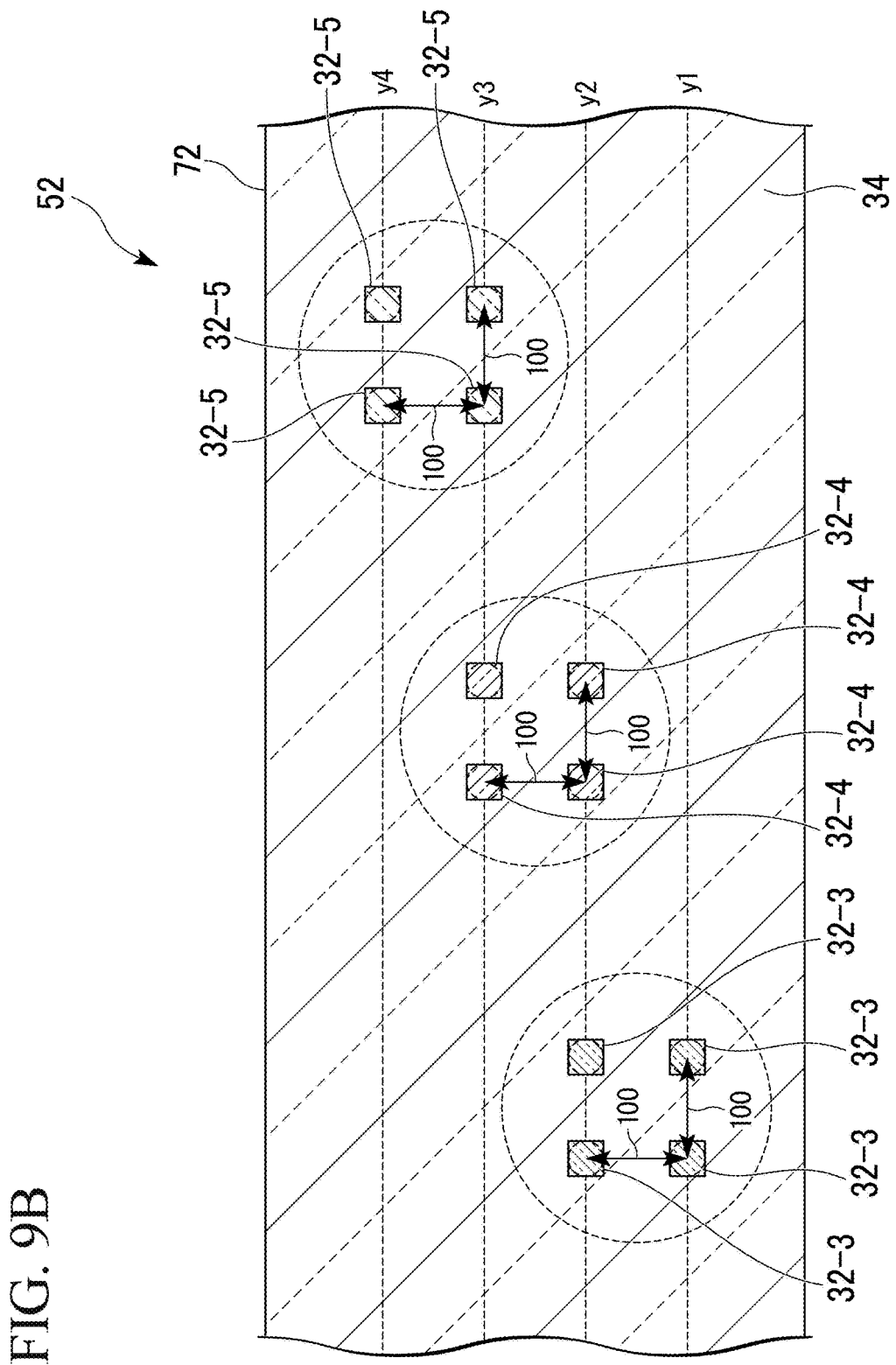
FIG. 9B is a front view of another end surface of the multi-core fiber connector illustrated in FIG. 8.

FIG. 9A is a front view of the end surface 71 of the multi-core fiber connector 52. FIG. 9B is a front view of the end surface 72 of the multi-core fiber connector 52. When the MCF 62 is connected to the end surface 71, as illustrated in FIG. 9A, a total of 12 cores are classified into cores (also referred to as core groups) 32-3, 32-4, and 32-5 of four cores each in the height direction in the end surface 71 of the multi-core fiber connector 52.

Here, the positions at which the cores 32-3, 32-4, and 32-5 exist in the height direction are y1, y2, y3, and y4 from the lower side. By again performing the manufacturing method described with reference to FIGS. 4A to 4F one more time (a total of two times), it is possible to manufacture the multi-core fiber connector 52 having the end surfaces 71 and 72 where 12-core MCFs 62 and 4-core MCFs 64 can be connected.

As illustrated in FIG. 9B, in the end surface 72 of the multi-core fiber connector 52, an arrangement similar to the square lattice-shaped arrangement of cores 84 in the cross-section of the 4-core MCFs 64 is formed by the two cores 32-3 formed at the height y1 and the two cores 32-3 at the height y2. Such an arrangement of the cores 32-3 can be achieved by changing the shape of the cores 32-3 only in the horizontal direction. As a result of such a configuration, it is possible to connect the four cores 32-3 of the 12-core MCFs 62 and a single 4-core MCF 64.

Also, an arrangement similar to the square lattice-shaped arrangement of the cores in the cross-section of the 4-core MCFs 64 is formed by the cores 32-4 formed at the height y2 and the cores 32-4 formed at the height y3. An arrangement similar to the square lattice-shaped arrangement of the cores in the cross-section of the 4-core MCFs 64 is formed by the cores 32-5 formed at the height y3 and the cores 32-5 formed at the height y4. As a result, the total 12 cores 32-3, 32-4, and 32-5 of the MCFs 62 can be connected to three 4-core MCFs 64 by the multi-core fiber connector 52.

By a configuration similar to that in the height direction, the total 12 cores 32-3, 32-4, and 32-5 of the MCFs 62 can be connected to three 4-core MCFs 64 in the horizontal direction. As described above, to ensure an easy and good connection between the MCFs 62 and 64 by the multi-core fiber connector 52, the center-to-center interval of cores 82 of MCFs 62 and the center-to-center interval of the cores 84 of MCFs 64, and the center-to-center interval of the adjacent cores 32-3, 32-4, and 32-5 in the multi-core fiber connector 52 in the height direction and the horizontal direction are all set to interval 100.

As described above, according to the multi-core fiber connector 52, it is possible to connect the MCFs 62 and 64 by changing positional change in the horizontal direction in the shape of the cores 32-2, 32-4, and 32-5 (that is, bending of the cores 32-2, 32-4, and 32-5 in the horizontal direction) that is available in the PLC. In addition, according to the second embodiment, it is possible to achieve the multi-core fiber connector 52 having high mass productivity and integration.

Third Embodiment

Figure 10:
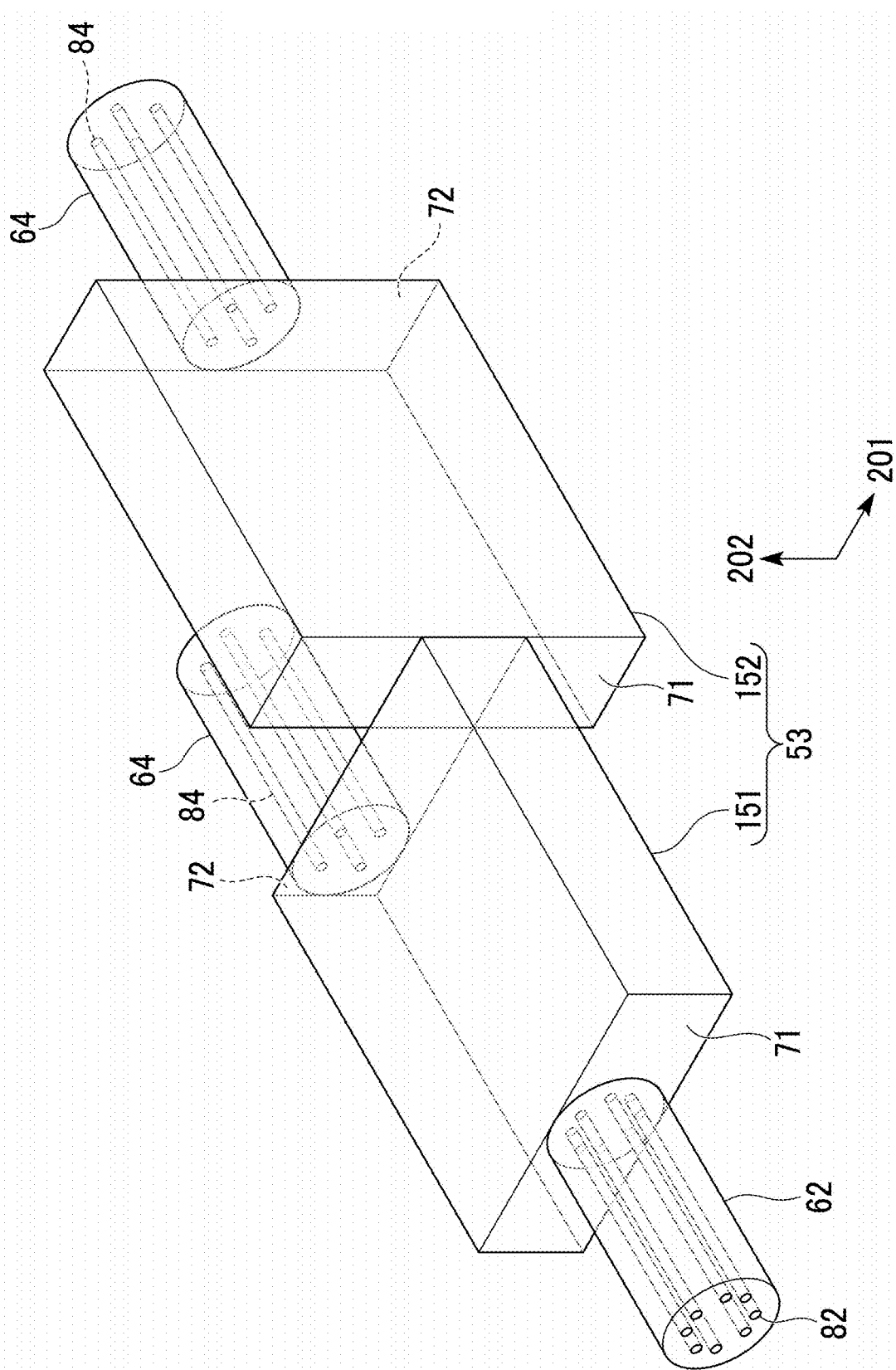
FIG. 10 is a perspective view of a combined multi-core fiber connector according to a third embodiment of the present disclosure.

FIG. 10 is a perspective view of a combined multi-core fiber connector (multi-core fiber connector) 53 according to a third embodiment of the present invention. The combined multi-core fiber connector 53 is configured by a combination of multi-core fiber connectors 151 and 152. The multi-core fiber connectors 151 and 152 are connected to each other at 90 degrees. M number (1 in FIG. 10) of 8-core MCFs 65 arranged in an annular shape are connected to the end surface 71 of the multi-core fiber connector 151. 2×M number of 4-core MCFs 64 are connected to the end surface 72 of the multi-core fiber connector 151 and 152. Specifically, M number of MCFs 64 and the end surface 71 of the multi-core fiber connector (the second planar waveguide) 152 are connected to the end surface 72 of the multi-core fiber connector (the first planar waveguide) 151. M number of MCFs 64 are connected to the end surface 72 of the multi-core fiber connector 152.

Figure 11A:
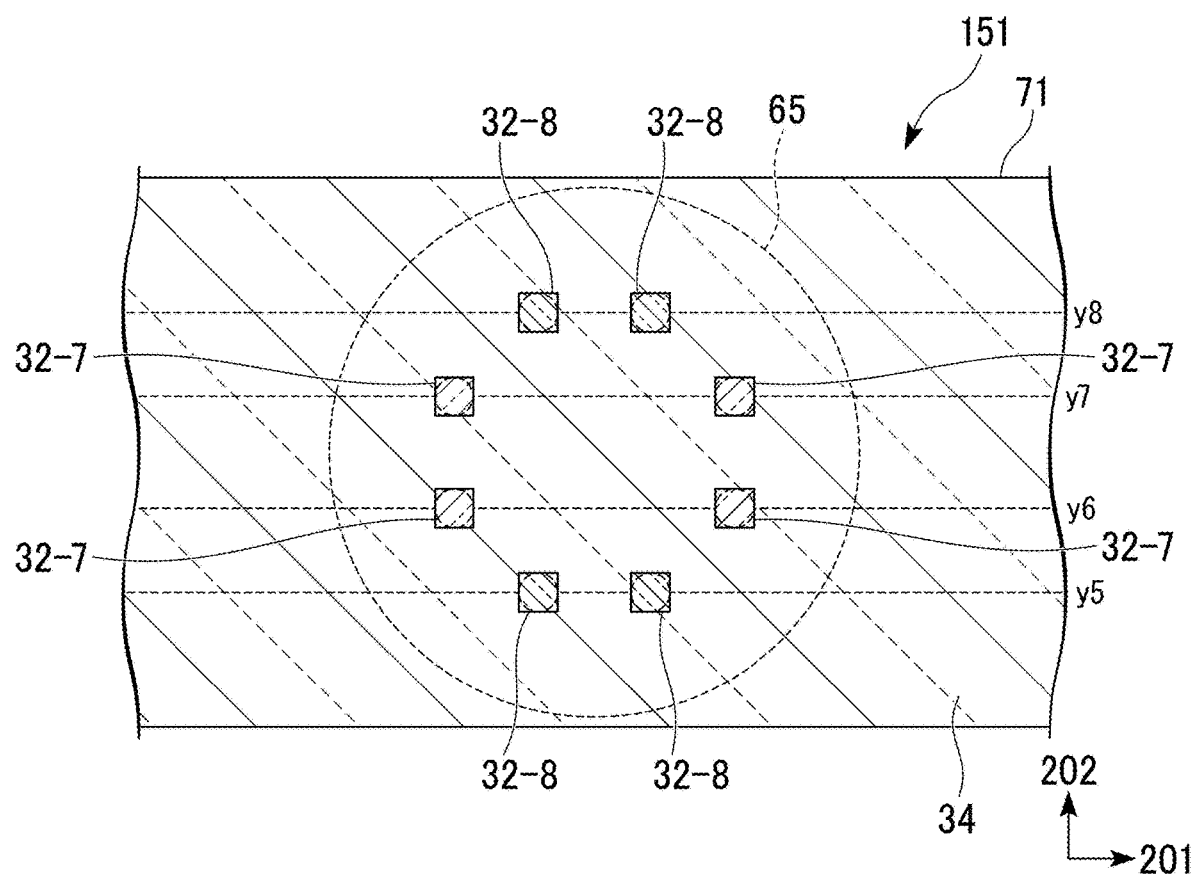
FIG. 11A is a front view of an end surface of one of the multi-core fiber connectors illustrated in FIG. 10.
Figure 11B:
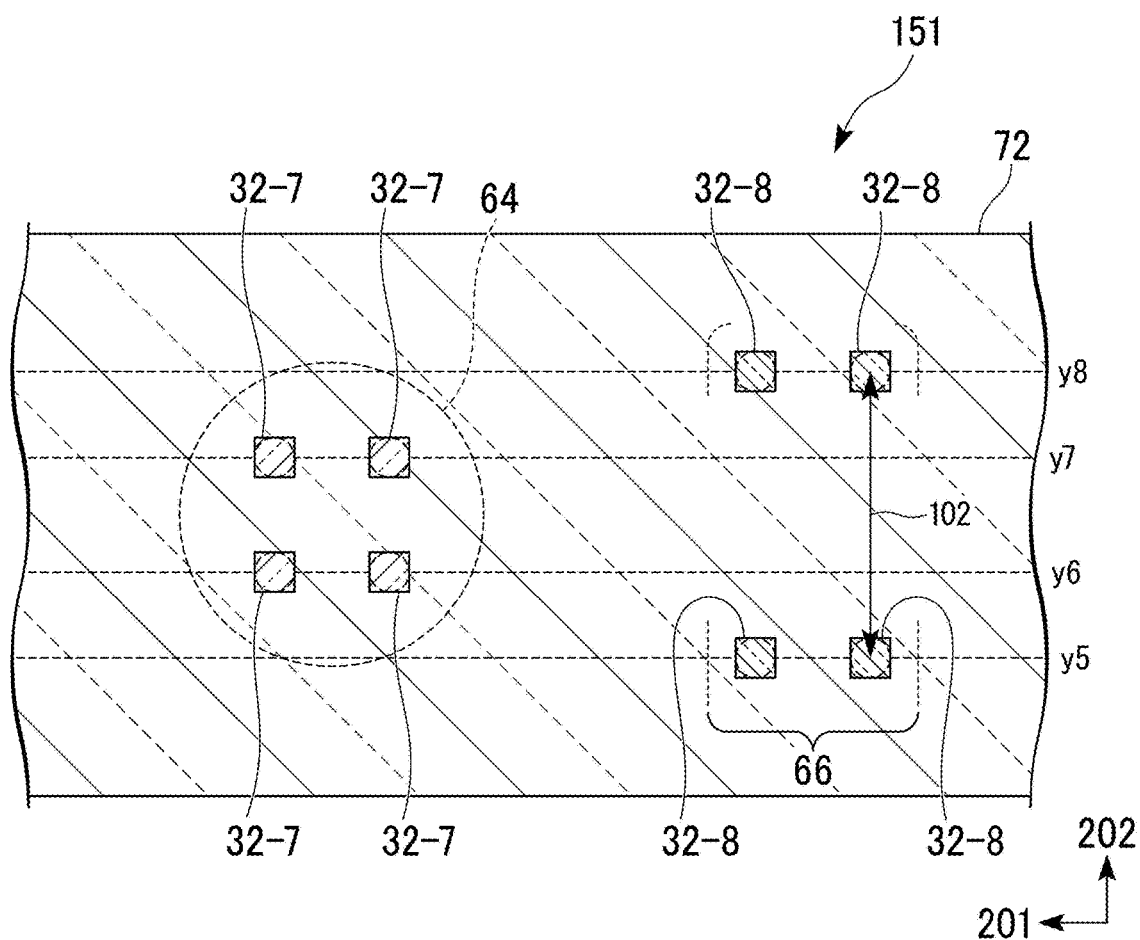
FIG. 11B is a front view of another end surface of one of the multi-core fiber connectors illustrated in FIG. 10.

FIG. 11A is a front view of the end surface 71 of the multi-core fiber connector 151. FIG. 11B is a front view of the end surface 72 of the multi-core fiber connector 151. When the MCF 65 is connected to the end surface 71, as illustrated in FIG. 11A, a total of 8 cores are classified into two groups of cores (or core groups) 32-7 and 32-8, with two cores respectively in each of the height directions.

Here, the positions at which the cores 32-7 and 32-8 exist in the height direction are y5, y6, y7, and y8 from the lower side. In the end surface 71 of the multi-core fiber connector 151, two of the cores 32-8 are present at the height y5, two of the cores 32-7 are respectively present at each of the heights y6 and y7, and two of the cores 32-8 are present at the height y8. By performing the manufacturing method described with reference to FIGS. 4A to 4F a total of two times, it is possible to manufacture the multi-core fiber connector 151 having end surfaces 71 and 72 where 8-core MCFs 65 and 4-core MCFs 64 can be connected.

As illustrated in FIG. 11B, in the end surface 72 of the multi-core fiber connector 151, an arrangement similar to the square lattice-shaped arrangement of the cores 84 in the cross-section of the 4-core MCFs 64 is formed by the two cores 32-7 formed at the height y6 and the two cores 32-7 formed at the height y7. Also, a 4-core waveguide structure 66 is formed by the two cores 32-8 formed at the height y5 and the two cores 32-8 formed at the height y8. The center-to-center distance (that is, the height) between the core 37-8 at the height y5 and the core 37-8 at the height y8, at the end surface 72 of the multi-core fiber connector 151 is 102.

The position of the two cores 32-8 formed at the height y5 and the two cores 32-8 formed at the height y8 in the height direction is aligned by changing positional change of the cores 32-8 in the horizontal direction of the cores 32-8 (that is, bending of the cores 32-8 in the horizontal direction).

With the help of the multi-core fiber connector 151, it is possible to connect a total of eight cores 32-7 and 32-8 of the MCF 65 to a total of four cores 32-7 of an MCF 64 and a total of four cores 32-8 of the waveguide structure 66.

Figure 12A:
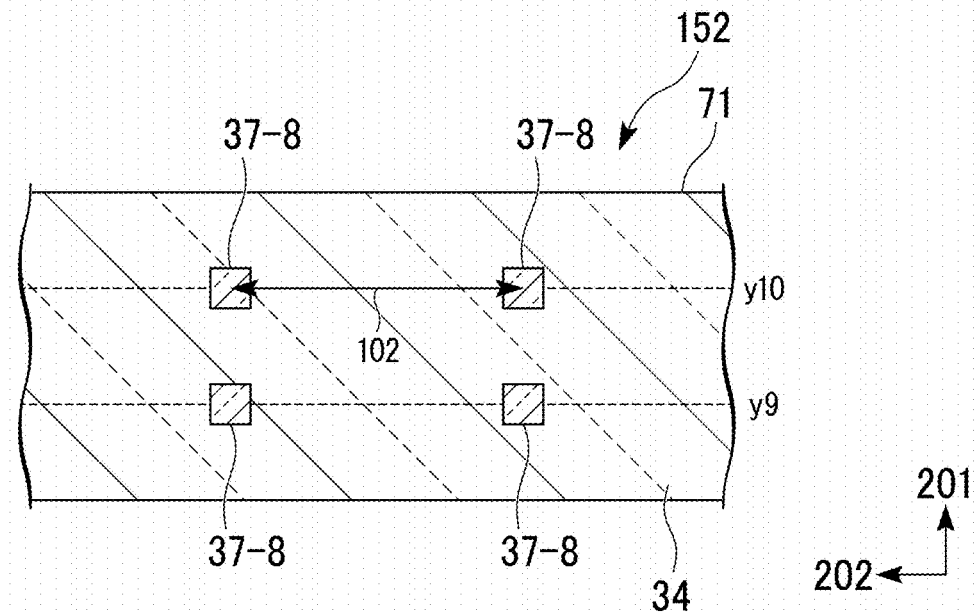
FIG. 12A is a front view of an end surface of the other multi-core fiber connector illustrated in FIG. 10.
Figure 12B:
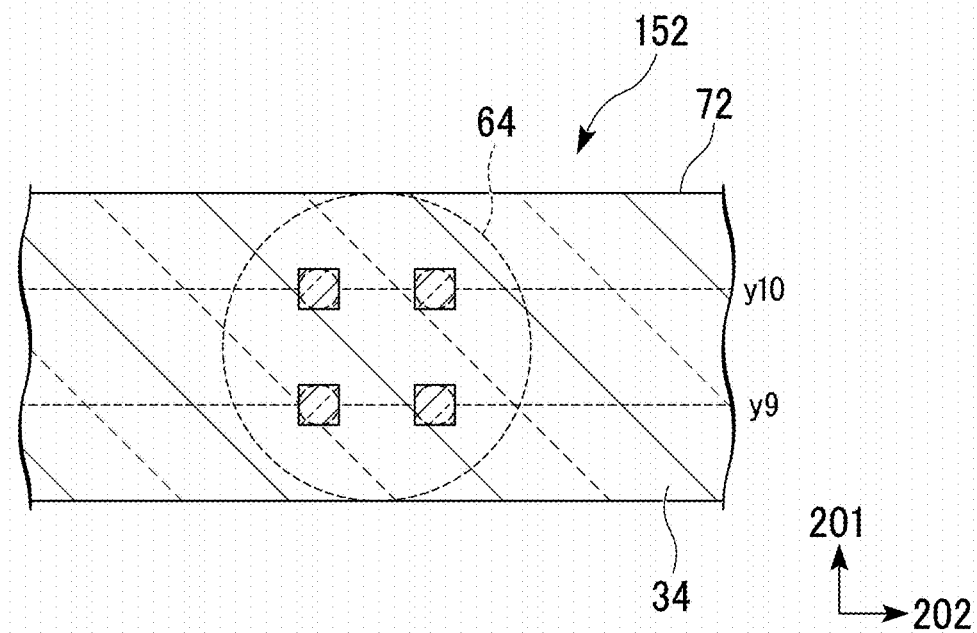
FIG. 12B is a front view of another end surface of the other multi-core fiber connector illustrated in FIG. 10.

FIG. 12A is a front view of the end surface 71 of the multi-core fiber connector 152. FIG. 12B is a front view of the end surface 72 of the multi-core fiber connector 152. As illustrated in FIG. 12A, two cores 37-8 whose centers are spaced from each other by the distance (that is, interval) 102 in the horizontal direction are formed at each of the heights y9 and y10, in the end surface 71 of the multi-core fiber connector 152.

As illustrated in FIG. 12B, in the end surface 72 of the multi-core fiber connector 152, an arrangement similar to the square lattice-shaped arrangement of the cores 84 in the cross-section of the 4-core MCFs 64 is formed by the two cores 32-8 formed at the height y9 and the two cores 32-8 formed at the height y10.

As described above, according to the combined multi-core fiber connector 53, it is possible to connect the MCFs 65 and 64 by only positional change in the horizontal direction in the shape of the cores 32-7 and 32-8 (that is, bending of the cores 32-7 and 32-8 in the horizontal direction) that is available in the PLC. In addition, according to the third embodiment, it is possible to achieve the combined multi-core fiber connector 53 having high mass productivity and integration.

Fourth Embodiment

Figure 13:
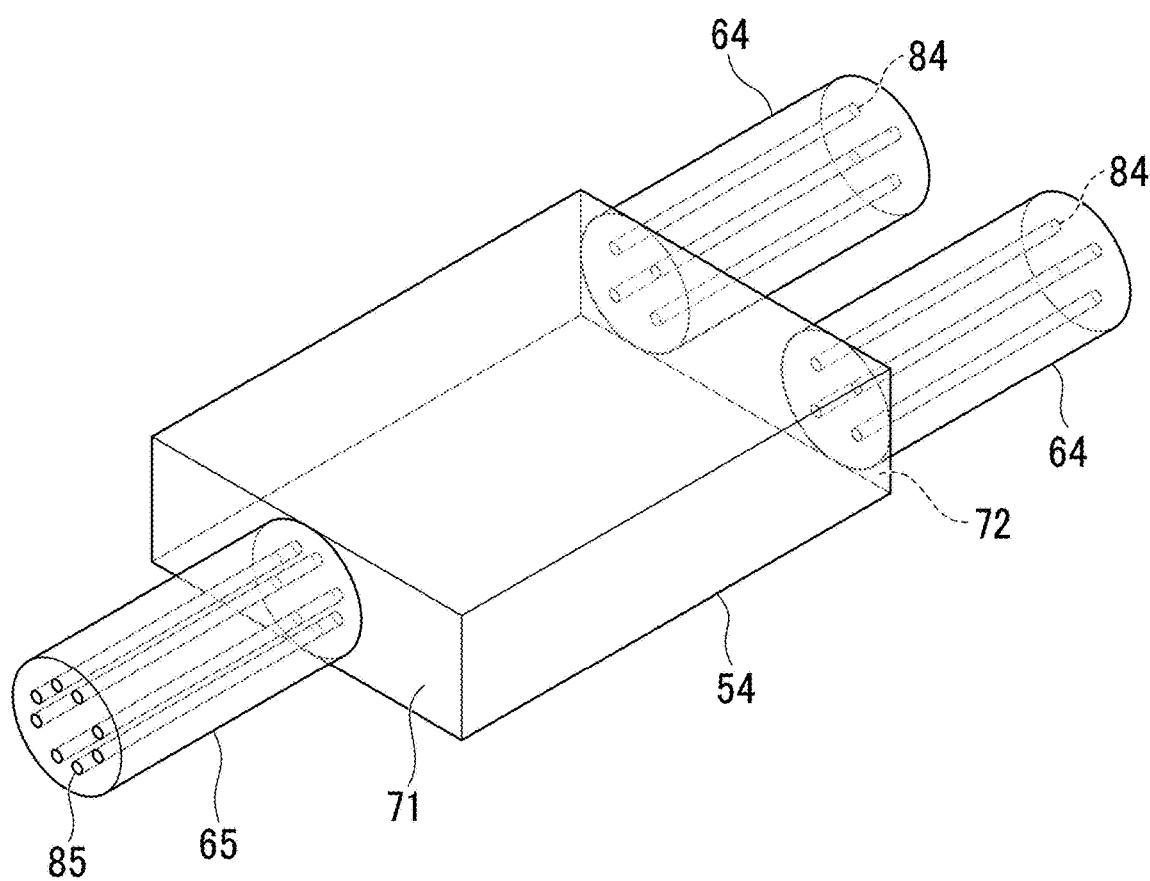
FIG. 13 is a perspective view of a multi-core fiber connector according to a fourth embodiment of the present disclosure.

FIG. 13 is a perspective view of a multi-core fiber connector 54 according to a third embodiment of the present invention. M number of 8-core MCFs 65 are connected to the end surface 71 of the multi-core fiber connector 54.

2×M number (2 in FIG. 5) of 4-core MCFs 64 are connected to the end surface 72 of the multi-core fiber connector 54.

Figure 14A:
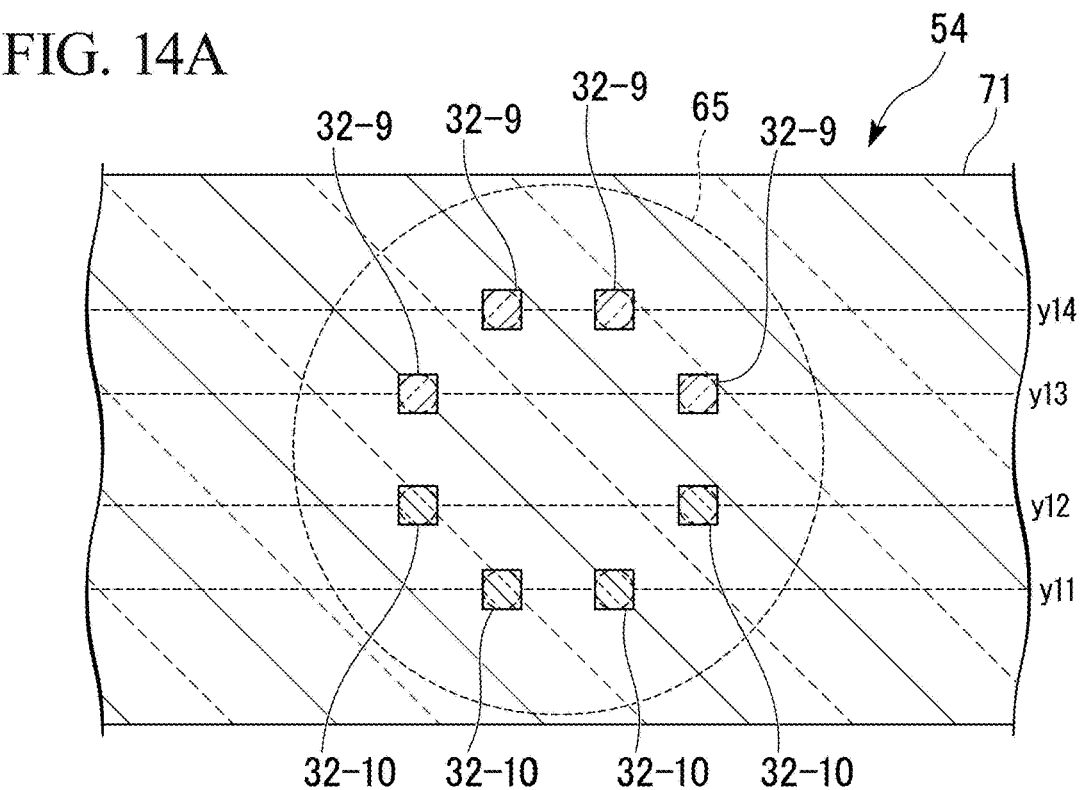
FIG. 14A is a front view of an end surface of the multi-core fiber connector illustrated in FIG. 13.
Figure 14B:
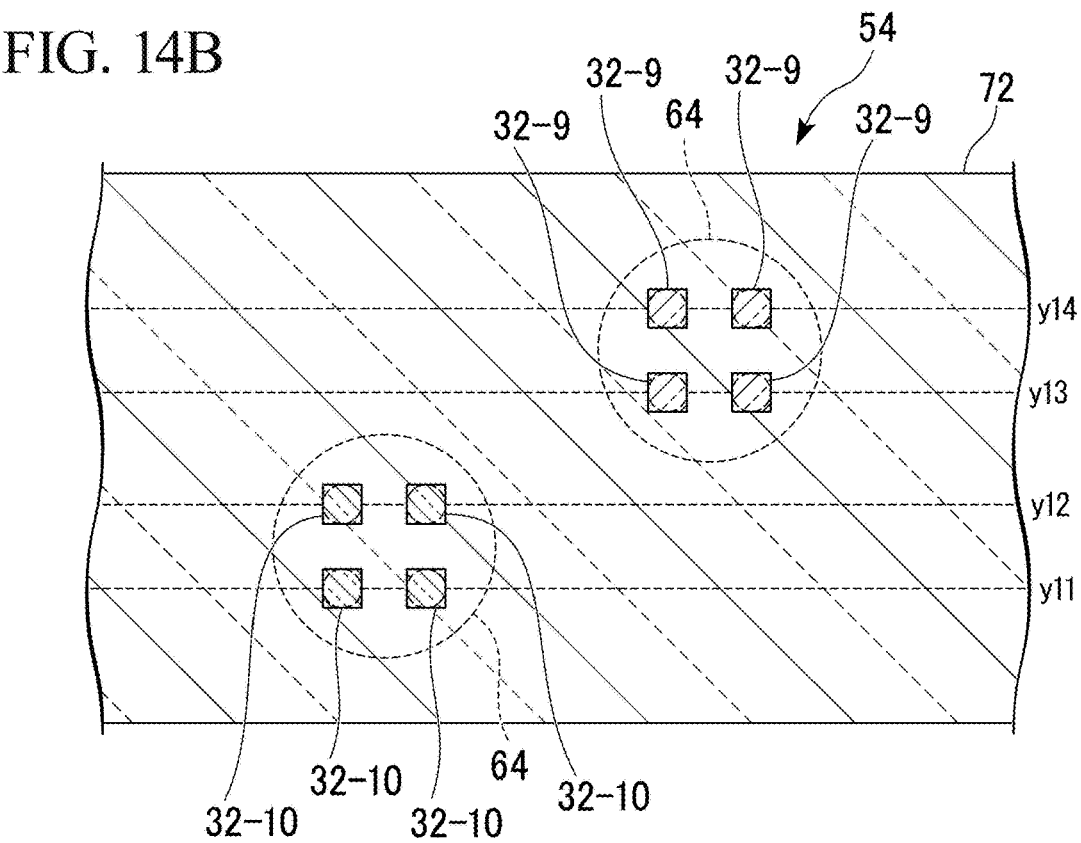
FIG. 14B is a front view of another end surface of the multi-core fiber connector illustrated in FIG. 13.

FIG. 14A is a front view of the end surface 71 of the multi-core fiber connector 54. FIG. 14B is a front view of the end surface 72 of the multi-core fiber connector 54. When the MCF 65 is connected to the end surface 71, as illustrated in FIG. 14A, a total of 8 cores are classified into two upper and lower groups of cores (or core groups) 32-9 and 32-10, with two cores respectively in each of the height directions.

Here, the positions at which the cores 32-7 and 32-8 exist in the height direction are y11, y12, y13, and y14 from the lower side. Two of the cores 32-10 are present at each of the heights y11 and y12, and two of the cores 32-9 are present at each of the heights y13 and y14. By performing the manufacturing method described with reference to FIGS. 4A to 4F a total of two times, it is possible to manufacture the multi-core fiber connector 54 having the end surface 71 to which at least the 8-core MCF 65 can be connected.

By changing positional change in the horizontal direction of the two cores 32-10 formed at the height y11 and the two cores 32-10 formed at the height y12 (that is, bending of the cores 32-10 in the horizontal direction), an arrangement similar to the square lattice-shaped arrangement of the cores 84 in the cross section of the 4-core MCFs 64 is formed. Similarly, by changing positional change in the horizontal direction of the two cores 32-9 formed at the height y13 and the two cores 32-9 formed at the height y14 (that is, bending of the cores 32-9 in the horizontal direction), an arrangement similar to the square lattice-shaped arrangement of the cores 84 in the cross section of the 4-core MCFs 64 is formed.

Figure 15A:
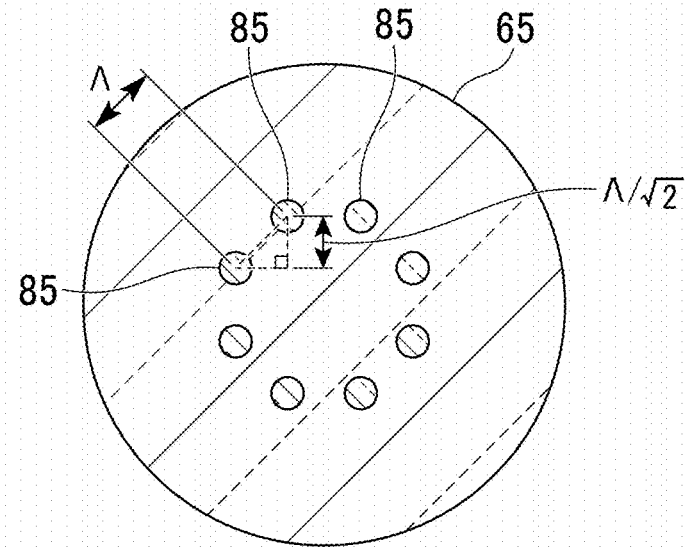
FIG. 15A is a cross-sectional view of an 8-core multi-core fiber connected to the multi-core fiber connector illustrated in FIG. 13.
Figure 15B:
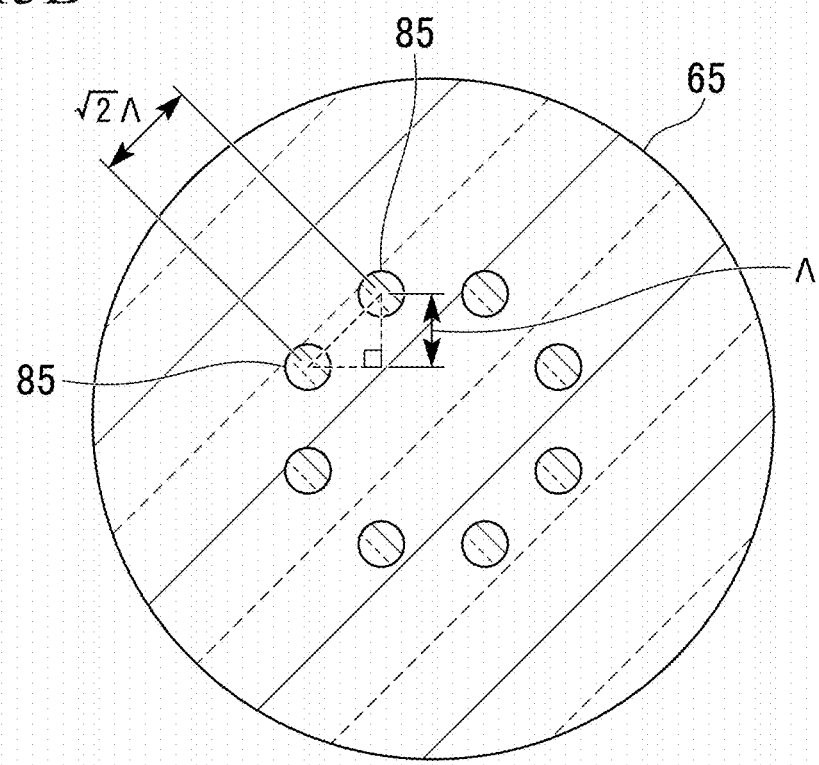
FIG. 15B is another cross-sectional view of the 8-core multi-core fiber connected to the multi-core fiber connector illustrated in FIG. 13.

FIGS. 15A and 15B are cross-sectional views of the MCF 65. As illustrated in FIG. 15A, if the interval between the cores 85 of the MCF 65 is A, the interval between the core 32-9 and the core 32-10 in the height direction between the height y2 and the height y3 is equal to $\Lambda$. In the same case, the distance between the cores 32-9 and between the cores 32-10 in the height direction between the height y1 and the height y2 or between the height y3 and the height y4 is $\Lambda/(\text{sq}(2))$. "sq (2)" means the square root of 2. In other words, in the fourth embodiment, to improve the connection between the MCFs 65 and 64 by the multi-core fiber connector 54, the MCF 65 should have an interval that is sq (2) times the interval between the cores 84 of the MCF 64 connected on the end surface 72 side.

It is noted that if the interval between the cores of the fibers to be connected does not satisfy the condition described above, it is possible to adjust the core interval by melting the fibers and increasing or decreasing the outer diameter of the cladding. Based on such adjustments, it is possible to apply the multi-core fiber connector 54 according to the fourth embodiment to a FIFO regardless of the interval between the cores of the fibers used. Note that by reducing the interval between the cores, the crosstalk between the cores may increase and the transmission signal may be adversely affected. Thus, in some cases, it may not be appropriate to reduce the interval between the cores. On this basis, it is preferable to adjust the interval between the cores depending on the case.

As described above, according to the multi-core fiber connector 54, it is possible to connect the MCFs 65 and 64 by changing positional change in the horizontal direction in the shape of the cores 32-9 and 32-10 (that is, bending of the cores 32-9 and 32-10 in the horizontal direction) that is available in the PLC. In addition, according to the fourth embodiment, it is possible to achieve the multi-core fiber connector 54 having high mass productivity and integration.

Other Embodiments

In the second to the fourth embodiments, a multi-core fiber connector for MCFs having a four-layer core structure (a structure in which the cores have a four-level height) has been described, however, the number of layers (the types of heights) of the multi-core fiber connector according to the present invention is not limited to four layers. For example, the cores of a 19-core MCF arranged in a hexagonal close-packed structure are divided into five layers in the height direction. When the number of layers increase, the number of laminations of the core layer 33 and the cladding 34 increase in the manufacturing method, and thus, the error in the position of the core in the height direction increases.

Figure 16:
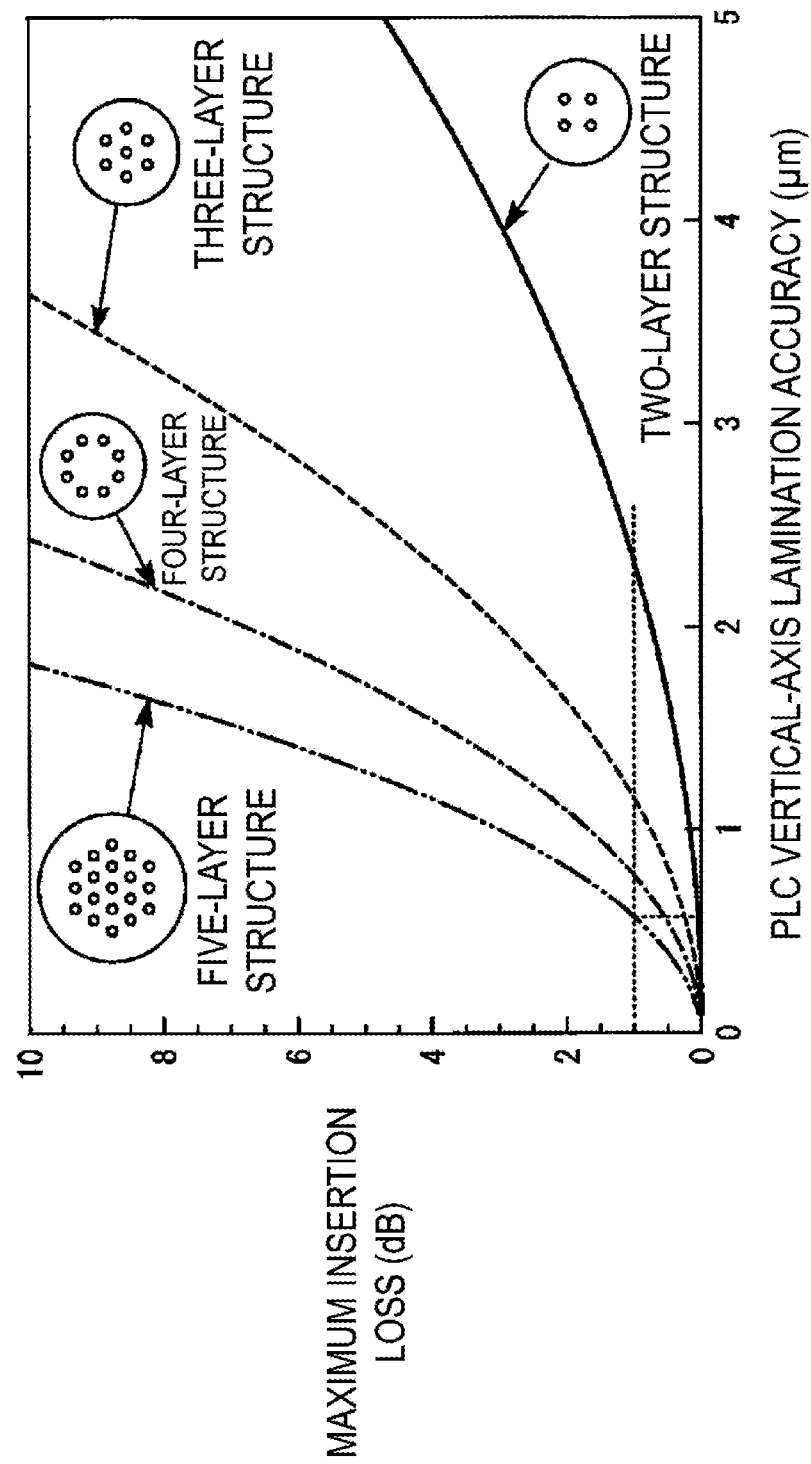
FIG. 16 is a graph in which the connection loss between a planar lightwave circuit and a multi-core fiber is calculated with respect to a lamination accuracy in a height direction of the planar lightwave circuit.

FIG. 16 is a graph in which the connection loss between a PLC and an MCF is calculated with respect to a lamination accuracy in a height direction of the PLC. In the numerical calculation, the mode field diameter of each core of the MCF was set to an equivalent value to that of the standard SMF, and was 10.6 µm at a wavelength of 1550 nm. FIG. 16 illustrates the results of numerical calculations for a two-layer structure (with 4 cores), a three-layer structure (with 7 cores), a four-layer structure (with 8 cores), and a five layer structure (with 19 cores). It is noted that 12 cores arranged in a square lattice shape form a four-layer structure, and the calculated results are the same as those for 8 cores. The lamination accuracy of the PLC is in the order of submicrons. It is understood that if the lamination accuracy of the PLC is 0.5 µm, which is the typical value, the number of layers in the multi-core fiber connector should be five or less to suppress the insertion loss to 1 dB or less.

Thus, the number of layers of the MCF that can be suitably connected to the multi-core fiber connector of the present invention is 5 or less.

The above description is based on the premise of a PLC made from quartz, but the multi-core fiber connector according to the present invention can also be applied to a PLC using a Si-based material.

Furthermore, in each embodiment, an example of connecting 4 cores, 8 cores, or 12 cores to an SMF or a 4-core MCF was illustrated. However, it is possible to connect to MCFs having 7 cores or 19 cores arranged in a hexagonal close-packed structure, and each MCF can also be connected to an MCF having other than four cores. In such a case, if the number of cores of the MCF connected on the input side (that is, on the end surface 71 side) is N and the number of fibers is N, and the number of cores of the MCF connected on the output side (that is, on the end surface 72 side) is Q and the number of fibers is P, the relationship M×N=P×Q should be satisfied.

Figure 17:
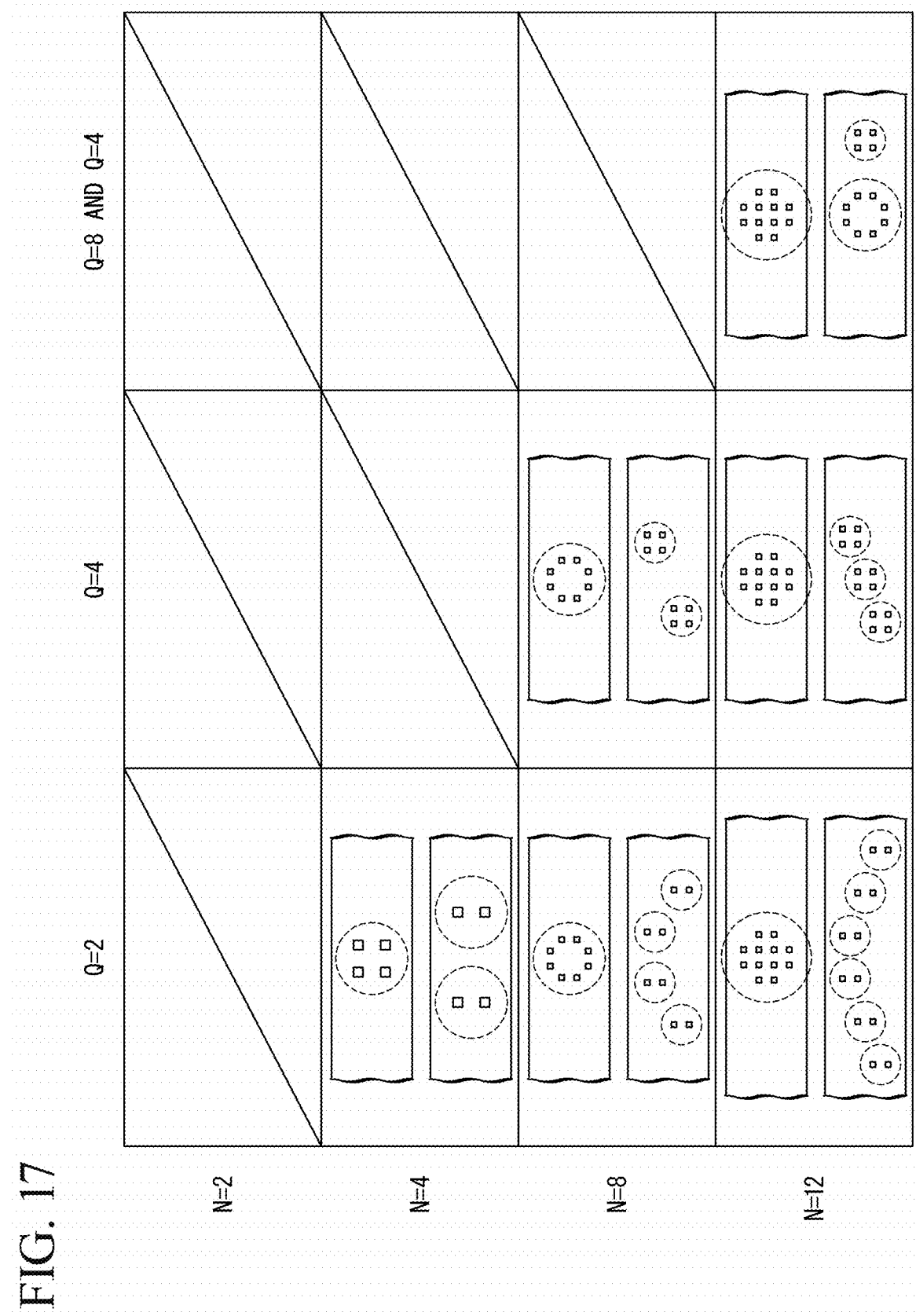
FIG. 17 illustrates a structure (cross-sectional view) of a multi-core fiber connector with respect to a combination of an integer N and an integer Q.

FIG. 17 illustrates a structure (cross-sectional view) of a multi-core fiber connector with respect to a combination of N and Q other than those described in the above embodiments. As illustrated in FIG. 17, it is possible to realize the multi-core fiber connector according to the present invention in some of the combinations.

In addition, as illustrated in the configuration example in which N is 12 and Q is 8 and 4, MCFs having different number of cores may also be connected to each other.

In addition, when Q is 1, then as described in the first embodiment, no matter what the value of N is, it is possible to connect to an SMF by widening the interval between cores beyond a predetermined interval.

Each of the above described embodiments illustrate one aspect of the present invention, and the present invention is not limited to the embodiments described above, and variations and modifications within the scope that includes the configuration of the present disclosure and can achieve objects and effects are included in the contents of the present invention. Moreover, the specific structure and shape and the like in the implementation of the present invention may be replaced with other structures, shapes, and the like as long as the object and effect of the present invention can be achieved.

REFERENCE SIGNS LIST

30: PLC (planar waveguide)
32: Core
51, 52, 53, 54: Multi-core fiber connector
60, 62, 64, 65: Multi-core fiber

The invention claimed is:

1. A multi-core fiber connector, comprising:
a planar waveguide having M×N number of cores and to which M number of fibers on an input side having N number of cores are connected,
wherein, in a connecting end surface on an output side of the planar waveguide, P number of fibers on the output side having Q number of cores are connected,
M×N is equal to P×Q,
the planar waveguide includes a plurality of the cores arranged in a horizontal direction at a same height position in the planar waveguide, and a laminated structure having the cores at different positions in a height direction, so as to be aligned with the cores of the fibers on the output side connected to the connecting end surface on the output side of the planar waveguide,
the positions of the M×N number of cores are constant in the height direction, and change only in the horizontal direction,
M is an integer equal to or greater than 1, and N is an integer equal to or greater than 2, Q is an integer equal to or greater than 1, and P is an integer equal to or greater than 1, and further comprising any one of
a structure where N is 4 and the cores of each of the fibers on the input side of the planar waveguide are arranged in an annular shape and Q is 2,
a structure where N is 8 and the cores of each of the fibers on the input side of the planar waveguide are arranged in an annular shape and Q is 4, or
a structure where N is 12 and the cores of each of the fibers on the input side of the planar waveguide are arranged in a square lattice shape and Q is 4.

2. A multi-core fiber connector, comprising:
a planar waveguide having M×N number of cores and to which M number of fibers on an input side having N number of cores are connected,
wherein, in a connecting end surface on an output side of the planar waveguide, P number of fibers on the output side having Q number of cores are connected,
M×N is equal to P×Q,
the planar waveguide includes a plurality of the cores arranged in a horizontal direction at the same height position in the planar waveguide, and a laminated structure having the cores at different positions in a height direction, so as to be aligned with the cores of the fibers on the output side connected to the connecting end surface on the output side of the planar waveguide,
the positions of the M×N number of cores are constant in the height direction, and change only in the horizontal direction,
M is an integer equal to or greater than 1, and N is an integer equal to or greater than 2,
Q is an integer equal to or greater than 1, and P is an integer equal to or greater than 1,
there are k types of height positions of the cores in the planar waveguide, wherein k is 4,
M number of fibers on the input side with 8 cores arranged in an annular shape are connected to the connecting end surface on the input side,
2×M number of fibers on the output side with 4 cores arranged in a square lattice shape are connected to the connecting end surface on the output side, and
the interval between the cores of the fibers on the input side is the square root of 2 times the interval between the cores of the fibers on the output side.

3. A multi-core fiber connector, comprising:
a planar waveguide having M×N number of cores and to which M number of fibers on an input side having N number of cores are connected,
wherein, in a connecting end surface on an output side of the planar waveguide, P number of fibers on the output side having Q number of cores are connected,
M×N is equal to P×Q,
the planar waveguide includes a plurality of the cores arranged in a horizontal direction at the same height position in the planar waveguide, and a laminated structure having the cores at different positions in a height direction, so as to be aligned with the cores of the fibers on the output side connected to the connecting end surface on the output side of the planar waveguide,
the positions of the M×N number of cores are constant in the height direction, and change only in the horizontal direction,
M is an integer equal to or greater than 1, and N is an integer equal to or greater than 2,
Q is an integer equal to or greater than 1, and P is an integer equal to or greater than 1,
there are k types of height positions of the cores in the planar waveguide, wherein k is 4,
M is 1 and P is 2,
a first and a second planar waveguides are connected together so as to form an angle of 90 degrees,
four cores connected to cores at height positions of a second layer and a third layer in the first planar waveguide is bent in the horizontal direction so as to be aligned with cores of one 4-core fiber connected to the connecting end surface on the output side, four cores of the first planar waveguide at height positions of a first layer and a fourth layer are joined with four waveguides of the second planar waveguide so as to be aligned with each other, and the four cores of the first layer and the fourth layer of the first planar waveguide are bent in the height direction in the second planar waveguide so as to be aligned with cores of a 4-core fiber on the output side connected to the connecting end surface on the output side.

* * * * *